United States Patent

Nomura

[15] 3,640,202
[45] Feb. 8, 1972

[54] SINGLE LENS REFLEX CAMERA
[72] Inventor: Katsuhiko Nomura, Kawagoe-shi, Japan
[73] Assignee: Asahi Kogaku Kogyo Kabushiki Kaisha, Tokyo-to, Japan
[22] Filed: Jan. 21, 1970
[21] Appl. No.: 4,651

[30] Foreign Application Priority Data

Jan. 31, 1969 Japan....................................44/7942

[52] U.S. Cl..................................................95/42, 95/64 B
[51] Int. Cl. .........................................................G03b 19/12
[58] Field of Search............................................95/42, 64 B

[56] References Cited

UNITED STATES PATENTS

| | | |
|---|---|---|
| 3,221,626 | 12/1965 | Fuketa........................................95/42 |
| 3,468,232 | 9/1969 | Knapp.........................................95/42 |
| 3,474,715 | 10/1969 | Nakamura...................................95/42 |

*Primary Examiner*—John M. Horan
*Assistant Examiner*—Monroe H. Hayes
*Attorney*—Stanley Wolder

[57] ABSTRACT

A single lens reflex camera with an automatic preset diaphragm includes a first spring loadable lever for advancing the camera mirror out of the objective light path and a second spring loadable lever for stopping down the diaphragm. The first lever includes a stop which engages a stop on the second lever to lock it in a retracted position when the first lever is in retracted position and cooperating elements releasably lock the first lever in its retracted position. Upon release, the first lever is spring advanced and advances the mirror and disengages the stops so that the second lever is spring advanced to stop down the diaphragm.

5 Claims, 3 Drawing Figures

3,640,202

INVENTOR
KATSUHIKO NOMURA

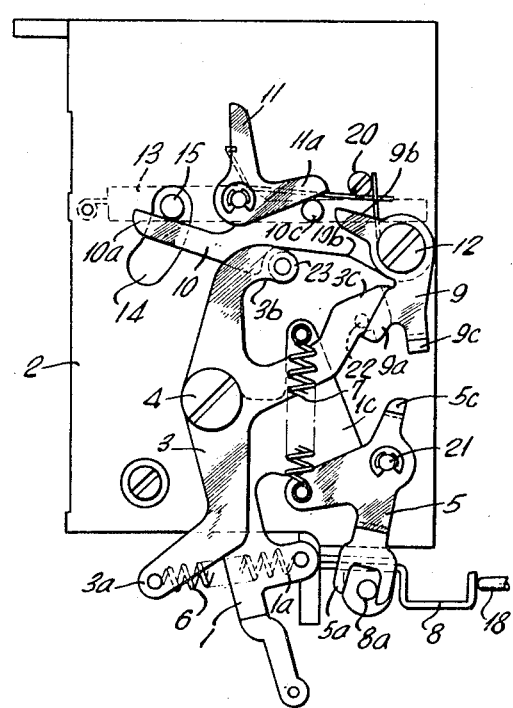

3,640,202

SINGLE LENS REFLEX CAMERA

BACKGROUND OF THE INVENTION

The present invention relates generally to improvements in single lens reflex cameras and it relates particularly to an improved mirror return and automatic preset diaphragm drive control mechanism in single lens reflex cameras.

In the conventional single lens reflex camera provided with an automatic preset diaphragm the mirror is rapidly retracted from the objective light path and the automatic diaphragm advanced to its preset position by spring-loaded levers which are charged by the film winding operation. The levers are maintained in their retracted spring-loaded condition until the actuation of the shutter release. In the aforesaid system it is necessary to accurately adjust the timing sequence of the initiations of the mirror retraction drive and the automatic diaphragm actuation. Accordingly, the spring-loaded mirror drive lever and the spring-loaded diaphragm actuating lever are each releasably retained in a retracted charged condition by individual, respectively releasable locking mechanisms. The locking mechanisms are coupled to the shutter release member so that they are released in a predetermined sequence upon actuation of the shutter release, for example, the diaphragm actuation lever is first released by its respective lock and the mirror return lever is released during the stop down actuation of the diaphragm. The conventional mechanism for achieving the above sequence of operations is a complicated bulky structure, often unreliable and otherwise leaving much to be desired.

SUMMARY OF THE INVENTION

It is a principal object of the present invention to provide an improved single lens reflex camera provided with an automatic preset diaphragm.

Another object of the present invention is to provide an improved mirror return and diaphragm drive mechanism in a single lens reflex camera.

Still another object of the present invention is to provide an improved mechanism of the above nature characterized by its ruggedness, simplicity, reliability and adaptability.

The above and other objects of the present invention will become apparent from a reading of the following description taken in conjunction with the accompanying drawings which illustrate a preferred embodiment of the present invention.

In a sense the present invention contemplates the provision in an automatic diaphragm, single lens reflex camera including a mirror swingable between a retracted viewing position and an advanced photographing position, and diaphragm control element movable between an advanced diaphragm stop down position and a retracted diaphragm release position, the improvement comprising mirror drive means movable between a mirror advanced position and a retracted position and spring urged to an advanced position, diaphragm drive means movable between a diaphragm control element advanced position and retracted position and spring urged to an advanced position, a first locking means for releasably locking a first of said drive means in a retracted position, and releasably engageable hold means carried by said mirror and diaphragm drive means and defining second locking means for releasably locking the second of said drive means in a retracted position, said hold means being disengaged with the advance of said first drive means to release said second drive means.

According to a preferred form of the improved mechanism the mirror drive comprises a first swingable lever and the diaphragm actuating drive comprises a second swingable lever, both levers being connected by respective springs to a charge lever which is advanced with the camera film winding operation. A locking lever actuated by the shutter release control releasably locks the first lever in its charged position, and the first lever in its charged position releasably locks the second lever in its charged position so that upon release of the first lever and its movement from its retracted position it releases the second lever which in turn advances the diaphragm control element.

The improved mechanism is compact and occupies considerably less space than the conventional mechanisms, requires fewer elements, is less expensive to produce and assemble, and is simple to adjust.

BRIEF DESCRIPTION OF THE DRAWINGS

FIG. 3 is a view similar to FIG. 1, the mechanism being illustrated in an actuated position following shutter release.

DESCRIPTION OF THE PREFERRED EMBODIMENT

Figure 1:
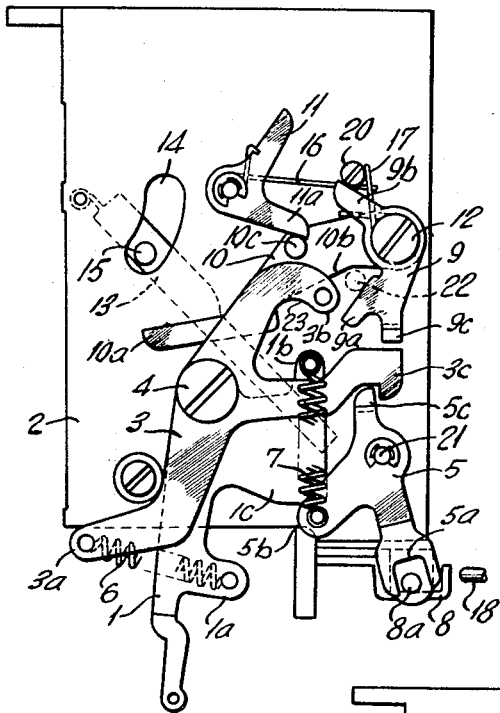
FIG. 1 is a side elevational view of the improved mirror and diaphragm drive mechanism, illustrated in a condition prior to the film winding and mechanism charging operation.

Referring now to the drawings which illustrate a preferred embodiment of the present invention, the reference numeral 2 generally designates the sidewall of a conventionally constructed mirror box forming part of a single lens reflex camera which includes an automatic preset objective diaphragm which is actuated by a longitudinal slide rod 18. A charge lever 1 and a three-armed mirror driving lever 3 are pivoted to the mirror box sidewall 2 by means of a pin or shaft 4. A mirror driving tension spring 6 is secured between one end 1a of the charge lever 1 and one end 3a of the mirror driving lever 3. A diaphragm driving lever 5 is pivoted to the mirror box sidewall 2 by means of a pin or shaft 21. Between one end 5b of the lever 5 and one end 1b of the charge lever 1 there is connected a diaphragm driving tension spring 7. A fork-shaped or yoke end 5a of the lever 5 loosely engages an operator pin 8a of a diaphragm driving intermediate member 8. The levers 3 and 5 are so related that when the levers 3 and 5 are under charged condition an abutment or hold defining end 5c of lever 5 engages the engaging portion of an abutment or hold defining end 3c of the mirror driving lever 3. A three-armed releasable locking lever 9 has a cammed edge of one end 9a thereof positioned in movement path of a shutter release member 22. In the swing path of one end 9b of the lever 9 there is positioned a stop pin 20. One end 9c of the retracted lever 9 is so positioned as to engage the end 3c of the retracted mirror driving lever 3.

A mirror driving intermediate lever 10 and the locking lever 9 are pivoted to the sidewall 2 of the mirror box by means of a pin or shaft 12. A free end 10a of the lever 10 engages a pin 15 projecting from a mirror seat 13 and through a slot 14 in the mirror box wall 2. An intermediate portion 10b of the lever 10 engages a pin 23 mounted on one end 3b of the mirror driving lever 3. A shutter release actuating lever 11 has one end 11a thereof positioned in the swing path of a pin 10c mounted on the intermediate lever 10. A spring 16 urges the shutter release actuating lever 11 clockwise, a spring 17 urges the mirror driving intermediate lever 10 counterclockwise, the stop-down driving pin 18 extends from the objective barrel toward the diaphragm driving intermediate lever 8.

Figure 2:
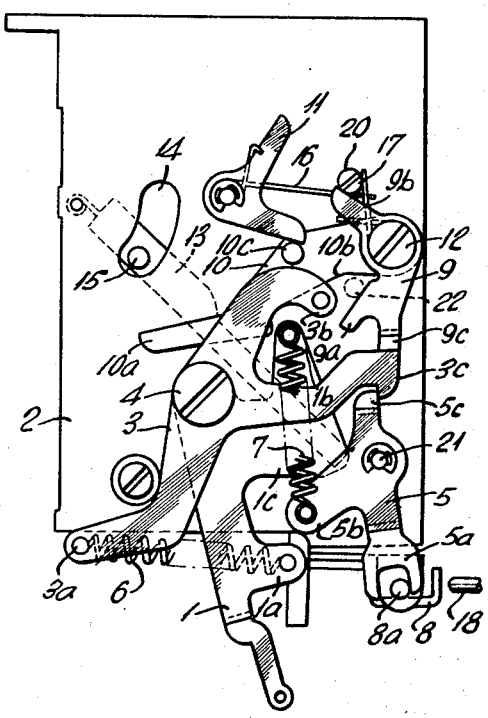
FIG. 2 is a view similar to FIG. 1, the mechanism being illustrated in a charged film wound condition.

The operation of the improved mechanism described above is as follows:

In the uncharged state of the mechanism as shown in FIG. 1 a photographing operation has been completed and the film is ready to be advanced or wound. When the film is wound, in driving connection therewith the charge lever 1 is swung to the right. Then, although connected through the mirror driving spring 6 and the diaphragm driving spring 7 secured to the ends 1a and 1b of the charge lever 1 respectively, the mirror driving lever 3 and the diaphragm driving lever 5 cannot advance or swing following the charge lever 1, since the end or stop 3c of the mirror driving lever 3 engages the end 9c of the locking lever 9 and the end or stop 5c of the diaphragm driving lever 5 engages the locking portion of the end 3c of the driving lever 3. Accordingly, the driving springs 6 and 7 are extended as the charge lever 1 is advanced or swung, and the driving levers 3 and 5 are retained in a loaded, retracted, locked state as shown in FIG. 2 with the driving springs 6 and 7 or energized.

When the shutter release member 22 is depressed through depression of the shutter button, the member 22 pushes the end 9a of the engaging lever 9 as it slides over the cam edge thereof so that the engaging lever 9 is swung counterclockwise against the action of the spring 17. Accordingly, the end 9c of the engaging lever 9 disengages the end 3c of the mirror driving lever 3, so that, owing to the stored energy of the mirror driving spring 6, the driving lever 3 rapidly advance swings counterclockwise. In the early stage of this advance swing movement, the diaphragm driving lever 5 is disengaged and released from the engaging portion of the end 3c of the mirror driving lever 3 and is swung clockwise owing to the stored energy of the diaphragm driving spring 7. This swing movement of the diaphragm driving lever 5 pushes a pin 8a loosely fitted in one end 5a of the lever 5 to the left so that the diaphragm driving intermediate lever 8 is pushed out to the right by a well-known mechanism, (not shown). Therefore, the stop-down driving pin 18 is pushed into the objective barrel so that the stop-down operation is performed in the well-known manner.

The mirror driving lever 3, when swinging, disengages the diaphragm driving lever 5, and the end 3b thereof pushes and causes the mirror driving intermediate lever 10 to swing clockwise. The free end 10a of the intermediate lever 10 engages the pin 15 and pushes it up so that the mirror seat 13 which supports the pin 15 is advanced or swung upwardly. In the last stage of the swing movement of the mirror driving intermediate lever 10, the pin 10c mounted on the lever 10 pushes one end 11a of the shutter release actuating lever 11 so that the lever 11 is swung counterclockwise against the action of the urging spring 16 and the other end thereof actuates a shutter opening actuating member (not shown) so as to open the shutter. The condition of the mechanism upon this shutter release actuation is shown in FIG. 3.

When the shutter release operation has been completed and the charge lever 1 makes its return movement in clockwise direction, the cam edge 1c of the lever 1 engages a roller 5d mounted on the end 5b of the diaphragm driving lever 5 and causes the driving lever 5 to effect a return swing movement in a counterclockwise direction, and, owing to the mirror returning force exerted on the intermediate lever 10 and the returning force of the release actuating lever 11, the mirror driving lever 3 makes a return swing movement in clockwise direction. Thus, all of these operating components return to the condition shown in FIG. 1 wherein the camera is ready for the next film winding operation. The above-described operation can be carried out at any time to cause mirror swing-up and diaphragm stop-down operations for photographing.

Although in the above-mentioned example the mirror driving lever 3 holds the diaphragm driving lever 5, if necessary for timing adjustment of the operations of these levers, the mechanism may be modified so that the diaphragm driving lever is held by the engaging lever and the mirror driving lever is held by the diaphragm driving lever.

As described above, according to the present invention, the improved mechanism so operates that one engaging lever holds either the mirror driving lever or the diaphragm driving lever and the thus held driving lever holds the other driving lever. Therefore, when compared with conventional mechanisms of the present nature in which each driving lever has its own engaging lever, the arrangement according to the present invention has such a great advantage both in its production and its function that the number of necessary parts are diminished, the assembly can be performed in a minimum of available space, the production cost is decreased, and the operation timing of the driving levers can be effectively adjusted.

While there has been described and illustrated a preferred embodiment of the present invention it is apparent that numerous alterations, omissions and additions may be made without departing from the spirit thereof.

I claim:

1. In an automatic diaphragm, single lens reflex camera including a mirror swingable between a retracted viewing position and an advanced photographing position, and a diaphragm control element movable between an advanced diaphragm stop down position and a retracted diaphragm release positIon, the improvement comprising mirror drive means movable between a mirror advanced position and a retracted position and spring urged to an advanced position, diaphragm drive means movable between a diaphragm control element advanced position and a retracted position and spring urged to an advanced position, a first locking means for releasably locking a first of said drive means in a retracted position, and releasably engageable hold means carried by said mirror and diaphragm drive means and defining second locking means for releasably locking the second of said drive means in a retracted position, said hold means being disengaged with the advance of said first drive means to release said second drive means, said first drive means comprising a first lever mounted for swinging between advanced and retracted positions and a first spring engaging said first lever and urging it toward an advanced position, said second drive means comprising a second lever mounted for swinging between advanced and retracted positions and a second spring engaging said second lever and urging it toward an advanced position, and said second locking means comprising first and second hold means defining abutments located on and movable with said first and second levers respectively and being in opposing engagement when said levers are in their retracted positions to releasably lock said second lever in its retracted position, said first abutment being movable with the advance of said first lever out of engagement with said second abutment to release said second lever.

2. The camera of claim 1 including selectively actuatable means for releasably locking said first lever in a retracted position.

3. The camera of claim 1 including a spring-loading arm, said first and second springs extending between said spring-loading arm and said first and second levers respectively.

4. The camera of claim 1 including a spring retracted movable shutter release member advanced in response to the advance of one of said levers.

5. In an automatic diaphragm, single lens reflex camera including a mirror swingable between a retracted viewing position and an advance photographing position, and a diaphragm control element movable between an advance diaphragm stop-down position and a retracted diaphragm release position, the improvement comprising a mirror driving first lever movable between an advanced position urging said mirror to its advance position and a retracted position and spring urged to its advanced position, a latching second lever releasably locking said first lever in its retracted position, and a diaphragm control third lever movable between an advance position advancing said diaphragm control element and a retracted position and spring urged to its position, said third lever being releasably locked in its retracted position by said first lever in its retracted position and being released by the advance of said first lever.

* * * * *